UNITED STATES PATENT OFFICE.

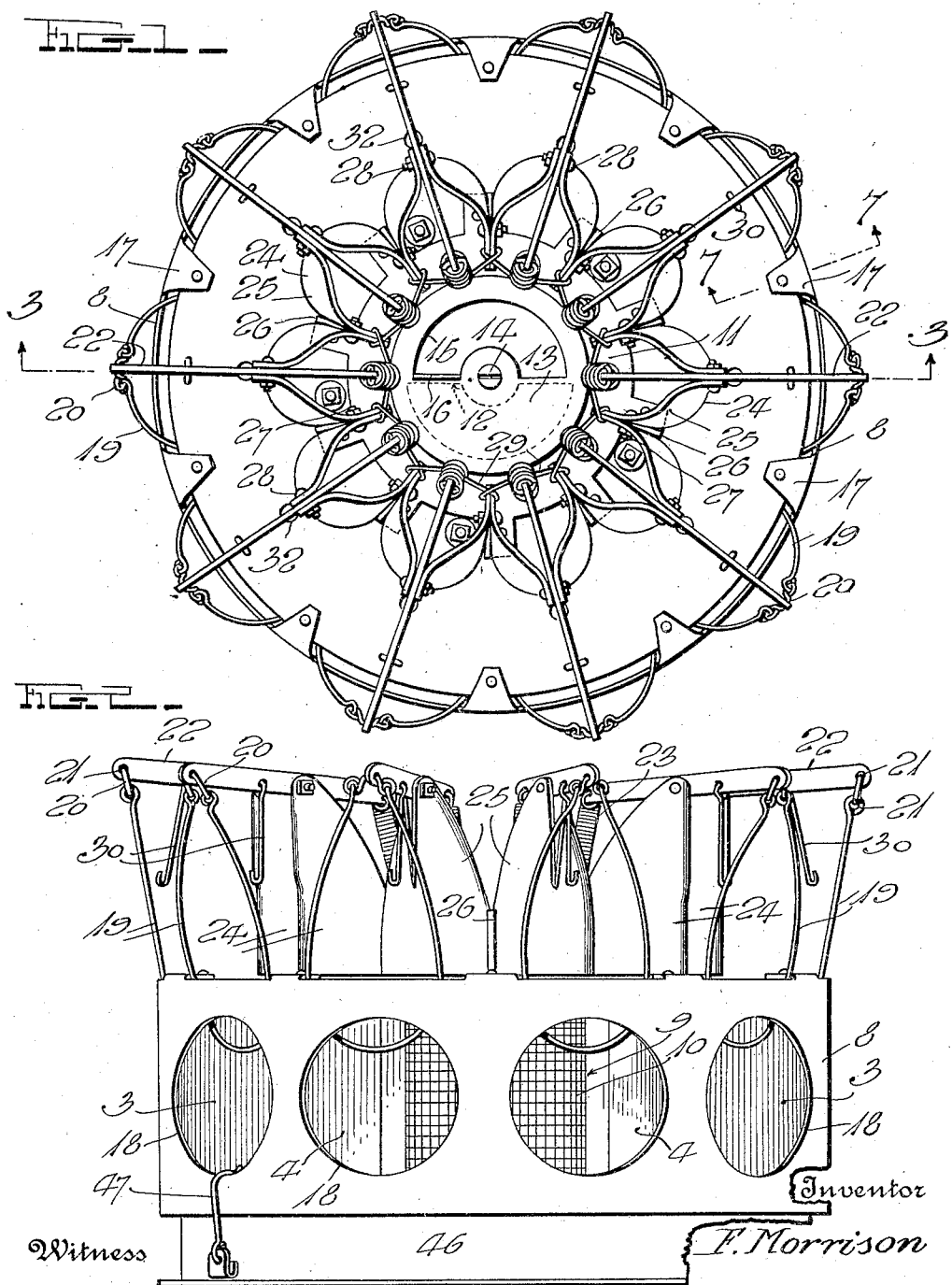

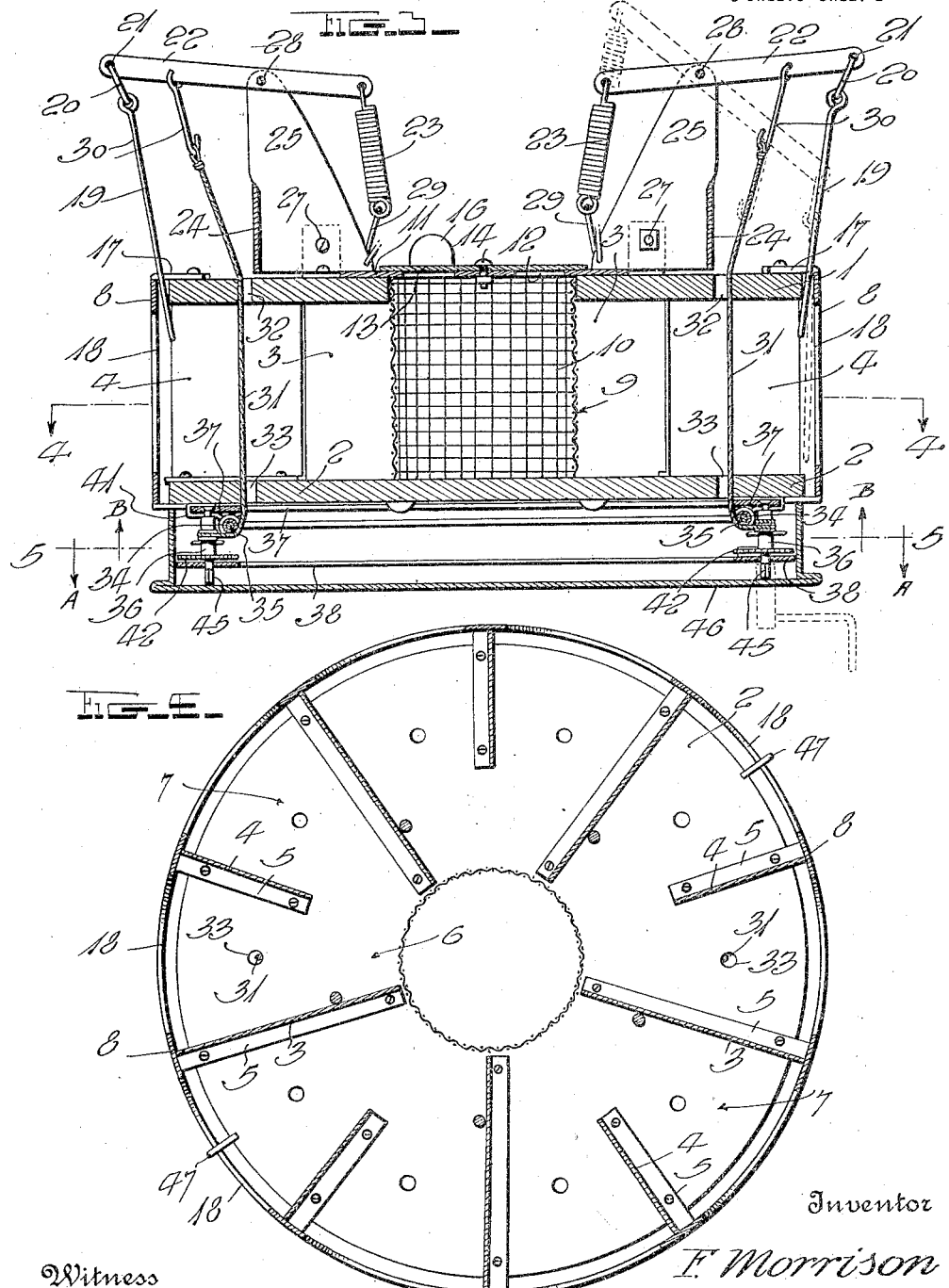

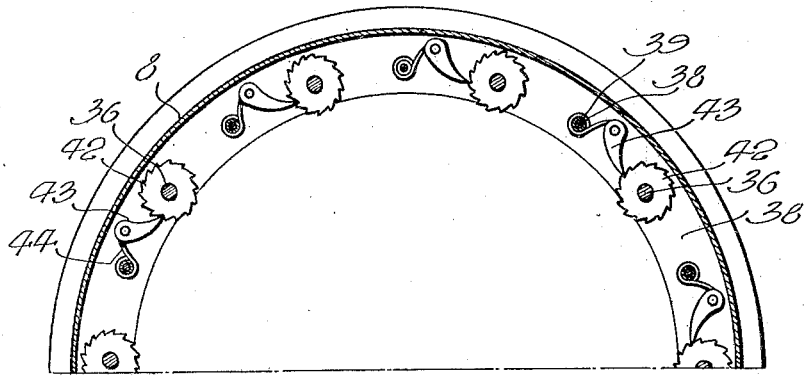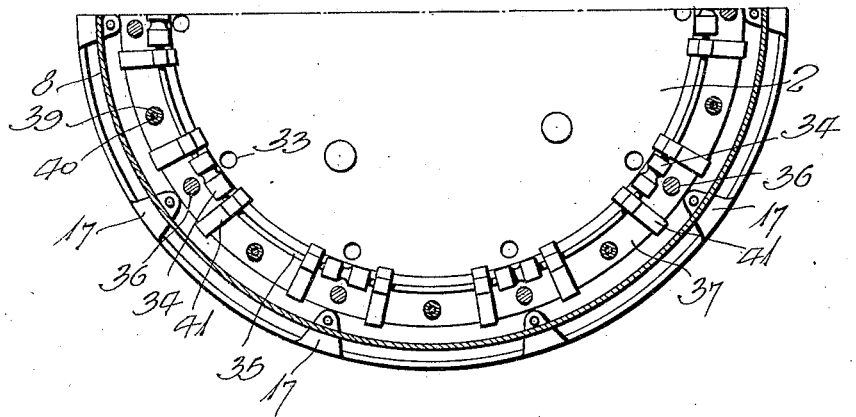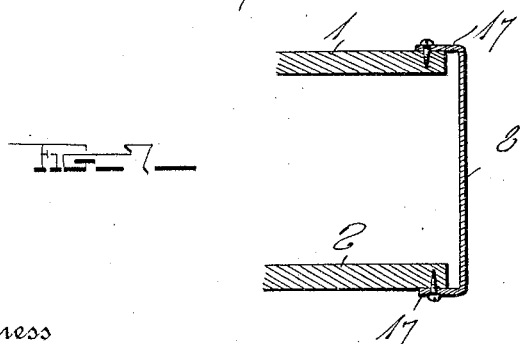

FRANK MORRISON, OF WARREN, MINNESOTA.

GOPHER-TRAP.

1,363,260. Specification of Letters Patent. Patented Dec. 28, 1920.

Application filed June 17, 1920. Serial No. 389,727.

*To all whom it may concern:*

Be it known that I, FRANK MORRISON, a citizen of the United States, residing at Warren, in the county of Marshall and State of Minnesota, have invented certain new and useful Improvements in Gopher-Traps; and I do declare the following to be a full, clear, and exact description of the invention, such as will enable others skilled in the art to which it appertains to make and use the same.

This invention relates to an improved trap of the choker type and one object of the invention is to provide a trap which will be used for catching rats, gophers and other similar animals, and which will be so constructed that the arm carrying the choker loop may be very easily drawn to a set position against the action of its spring and to provide improved means for drawing this arm to the set position which will permit of setting without danger of catching the fingers of the operator.

Another object of the invention is to so construct this trap that the animal after passing into the trap through the loop must cut through the cord which is used for drawing the arm to the set position in order to approach the bait chamber and thus release the arm and permit it to move upwardly to its normal position, thereby drawing the choker loop upwardly and killing the animal.

Another object of the invention is to so construct this trap that a large number of entrances may be provided in a relatively small body thus permitting a great many of the animals to be caught with one setting of the trap.

Another object of the invention is to provide a trap which will be very strong and durable and very effective in operation.

Another object of the invention is to so construct the trap that the setting mechanism with which the line will be connected will be positioned beneath the bottom of the main body of the trap where it will be protected by a removable support.

Another object of the invention is to so construct the trap that the bait may serve for all of the compartments thus making it unnecessary to provide a separate bait for each compartment.

Another object of the invention is to so construct this trap that the principal portions thereof may be formed of sheet metal thus permitting the trap to be cheaply produced.

This invention is illustrated in the accompanying drawings, wherein:—

Figure 1 is a top plan view of the improved trap,

Fig. 2 is a side elevation of the improved trap,

Fig. 3 is a vertical transverse sectional view through the trap taken along the line 3—3 of Fig. 1, Fig. 4 is a horizontal sectional view taken along the line 4—4 of Fig. 3, Fig. 5 is a sectional view through one-half of the body portion of the trap taken along the line 5—5 and looking in the direction of the arrows A, Fig. 6 is a view taken along the same line and looking in the direction of the arrows B, and Fig. 7 is a fragmentary sectional view taken along the line 7—7 of Fig. 1.

This improved rat trap is provided with a body or housing having a top 1 and a bottom 2, the top and bottom being preferably formed of wood and held in vertical spaced relation by partitions 3 and 4 which are connected with the top and bottom by fasteners which pass through the upper and lower flanges 5 of the partitions. From an inspection of Fig. 4, it will be seen that the partitions 3 are of greater depth or length than the partitions 4 and will divide the housing into compartments 6 which in their turn are subdivided into compartments 7 by the partitions 4. The compartments 6 extend inwardly from the walls 8 of the housing to the central portion of the housing which constitutes a bait chamber 9, which chamber is inclosed by a wall 10 formed of wire so that the animals can see and smell the bait contained in this housing but cannot reach it. This bait is placed in the housing through the upper end thereof and this upper end is covered by a plate 11 which is secured to the top 1 and is provided with an inlet opening 12. A closure plate 13 for the opening 12 is rotatably connected with the plate 11 by a fastener 14 and is provided with an opening 15 for registering with the opening 12 when the closure plate is turned to the open position through the medium of the finger engaging tongue 16. It will thus be seen that there will be provided a housing having a top and bottom formed of wood and side walls which will be formed of sheet metal and held in place by fasteners which pass through the tongue 17 and partitions which will also be formed of metal for dividing the housing into chambers.

In order to catch the rats or other animals which enter the housing through any of the openings 18 formed in the wall 8, there has been provided for each compartment 7 a choker loop 19 which is formed of wire and extends between the upper edge of the wall 8 and the top one of the housing. This loop 19 has its ends connected with a yoke 20 which is also formed of wire and is mounted in an opening 21 in the outer end of a rocker arm 22, the rocker arms 22 extending radially of the housing and each having its inner end engaged by a spring 23. In order to pivotally mount the rocker arms 22, there has been provided a plurality of fulcrum standards 24 which are also formed of metal. These standards are in the form of hollow shells which have their side wings 25 connected with the upstanding ears 26 of the plates 11 by bolts 27. The blank from which each of the standards is formed has its upper end portion split longitudinally and a portion thereof cut away to permit the upper end portions of the side wings 25 to be brought together as shown clearly in Fig. 1 with the rocker arms 22 positioned between the upper end portions of the side wings and pivotally mounted by means of pivot pins 28. It will thus be seen that the rocker arms will be pivotally mounted with their outer ends carrying the choker loops and their inner ends connected with the spring 23 which springs have their lower ends connected with the anchoring wire 29. This wire is passed through openings formed in the wings as shown clearly in Fig. 1 and is bent between the side arms of the standards so that the springs will be properly positioned and will serve very efficiently to draw the rocker arms to the normal position shown in Fig. 3.

In order to draw the rocker arms to the dotted line position of Fig. 3, against the action of the springs, there has been provided hooks 30 which are mounted intermediate the standards 24 and the outer ends of the rocker arms. These hooks will engage lines 31 which will be passed through openings 32 and 33 formed in the top and bottom 1 and 2 of the housing and after passing through the openings in the bottom will be carried outwardly in engagement with the guide rollers 34 which are mounted upon the pivot rod 35 and wound upon the drums 36. The drums 36 are rotatably mounted between the upper and lower rings or bands 37 and 38 which are held in spaced relation by collars 39 positioned upon the screws 40 for holding the drum carrying rings in engagement with the bottom 2 of the housing and the pivot ring 35 is connected with the upper ring 37 by brackets 41. Ratchet wheels 42 are provided upon the drums 36 and engaged by pawls 43 which are pivotally connected with the lower band or ring 38 and yieldably held in engagement with the ratchet wheels by the springs 44 and it will thus be seen that when the lines 41 are wound upon the drums by turning these drums through the medium of a key which engages the extending end 45 of the drums, the lines will be held drawn tight.

When this improved trap is in use, the bait will be placed in the bait receptacle 9 through the opening 12 and the cover 13 will then be swung or turned to the closed position. The lines 31 which will preferably be of heavy cord will be connected with the hooks and will then be passed through the openings 32 and 33 and wound upon the drums 36. The drums will then each be turned by the key and the lines will be drawn to swing the rocker arms 22 to the dotted line position of Fig. 3. The hood 46 will then be put in place to cover the drum carrying frame positioned beneath the flooring and will be releasably held in place by the hooks 47 which are loosely connected with the hood and will engage the side walls as shown in Fig. 2. The trap will then be put in place and as a rat, gopher or other similar animal attempts to reach the bait, it must enter the trap through one of the openings 18. Before the animal can reach the bait chamber 9, it must pass through the chamber 7 and as the chamber 7 is divided by the line 31 which is drawn very tight and will not leave room for the animal to pass, the animal will cut the line with its teeth and the rocker arm which is connected with this line will be released and will be swung to the full line position of Fig. 3 by its spring. This will draw the choker loop 19 upwardly and the animal will be choked to death. If desired the line 31 may be dipped in wax, paste or any other similar substance which will serve not only to strengthen the line but also will tend to attract the animal to the line and cause the animal to more readily cut the line through. A trap has thus been provided which will be very efficient in operation and which can be very easily set without danger of catching the fingers while setting the trap.

What is claimed is:—

1. A trap comprising a housing having a central bait holding compartment having perforated walls, the housing having trapping compartments extending in radiating relation from the bait holding compartment and the side walls of the housing having openings for entrance to the trapping compartments, rocker arms pivotally mounted above the housing in radiating relation, choker loops connected with the outer end portions of the rocker arms and extending down into the trapping compartments, springs connected with the inner end portions of the rocker arms for yieldably retaining the same in a normal position with the choker loops drawn upwardly, line engaging elements connected with the rocker arms, and winding drums rotatably mounted beneath the housing for drawing upon lines connected with the rocker arms and passing through the trapping chambers to draw the rocker arms against the action of the springs, the rocker arms being released to draw the choker loops upwardly by an animal entering a trapping compartment and cutting the line.

2. A trap comprising a housing having trapping compartments therein and having its side walls provided with openings constituting entrances to the trapping compartments, rocker arms pivotally mounted above the housing and yieldably held in a normal position, choker loops connected with the rocker arms and extending down into the trapping compartments, winding drums rotatably mounted beneath the housing and means for connecting a line with each of the rocker arms, the lines being passed through the trapping compartments and wound upon the drums, winding of the lines upon the drums drawing the rocker arms out of their normal positions to lower the choker loops in the compartments for engaging an animal when the animal enters a compartment and cuts through the portion of the line passing through the compartment.

3. A trap comprising a housing having trapping compartments provided with entrances, an annular frame positioned beneath the housing and having drums rotatably mounted therein and provided with ratchet wheels, pawls carried by the frame for engaging the ratchet wheels, rocker arms pivotally mounted upon the housing, choker loops connected with the outer end portions of the rocker arms for extending down into the trapping compartments, springs engaging the rocker arms to yieldably retain the same in a normal position with the choker loops drawn upwardly, and means carried by the arms for engaging the line passing through the trapping compartments and wound upon the drums for drawing the rocker arms downwardly against the action of the springs when the drums are rotated.

4. A trap comprising a housing having trapping compartments provided with inlets, standards mounted upon the housing, each standard being substantially U-shaped in cross section and split from its upper end to provide side wings, rocker arms positioned between the upper ends of the side wings, pins connecting the upper ends of the side wings and pivotally mounting the rocker arms, means yieldingly retaining the rocker arms in a normal position, means for engaging lines passing through the trapping compartments and connecting the lines with the rocker arms, and means for drawing upon the lines to move the rocker arms against the action of the means retaining them in a normal position.

5. A trap comprising a housing having trapping compartments provided with entrances, animal catching means movably mounted and yieldably held in a normal position, breakable lines connected with the animal engaging means, and winding drums rotatably mounted for drawing upon the line when the lines are wound upon the drum and moving the animal engaging means out of the normal position and into an operative position.

6. A trap comprising a housing having a bait compartment and trapping compartments positioned about the bait compartment, a plate carried by the top of the housing and having an opening for communicating with the bait compartment, a closure disk connected with the plate for movement into and out of position for closing the entrance to the bait compartment, standards positioned about the plate, ears extending upwardly from the plate and having the standards connected therewith, rocker arms pivotally connected with the upper end portions of the standards, a wire carried by the standards, springs connected with the wire and with the inner end portions of the rocker arms; choker loops connected with the outer end portions of the rocker arms and extending down into the trapping compartments, lines connected with the rocker arms and extending through the trapping compartments, and means for drawing upon the line to swing the rocker arms against action of the springs.

7. A trap comprising a housing having trapping compartments, animal engaging means for each compartment yieldably held in a normal position, breakable lines connected with the animal engaging means and extending through the compartments, means beneath the housing for drawing upon the line, and a protecting hood positioned beneath the housing and releasably connected therewith.

In testimony whereof I have hereunto set my hand in the presence of two subscribing witnesses.

FRANK MORRISON.

Witnesses:
A. N. ECKSTROM,
FLORENCE HANSON.